United States Patent
Ning et al.

(10) Patent No.: US 11,543,488 B2
(45) Date of Patent: Jan. 3, 2023

(54) OPTICAL SAFETY SENSOR

(71) Applicant: OMRON Corporation, Kyoto (JP)

(72) Inventors: Xiaoguang Ning, Otsu (JP); Toshiyuki Higuchi, Kusatsu (JP)

(73) Assignee: OMRON Corporation, Kyoto (JP)

( * ) Notice: Subject to any disclaimer, the term of this patent is extended or adjusted under 35 U.S.C. 154(b) by 937 days.

(21) Appl. No.: 16/219,946

(22) Filed: Dec. 14, 2018

(65) Prior Publication Data

US 2019/0277944 A1    Sep. 12, 2019

(30) Foreign Application Priority Data

Mar. 12, 2018  (JP) .............................. JP2018-044575

(51) Int. Cl.
*G01S 5/30* (2006.01)
*G01B 11/02* (2006.01)
(Continued)

(52) U.S. Cl.
CPC .............. *G01S 5/30* (2013.01); *G01B 11/026* (2013.01); *G01C 3/08* (2013.01); *G01D 5/28* (2013.01);
(Continued)

(58) Field of Classification Search
CPC . G01S 5/30; G01S 17/10; G01S 17/88; G01S 17/87; G01S 7/4815; G01S 17/08; G01B 11/026; G01C 3/08; G01D 5/28; G02S 7/497; F16P 3/14; F16P 3/144; G08B 15/00
(Continued)

(56) References Cited

U.S. PATENT DOCUMENTS

| 8,224,032 B2 | 7/2012 | Fuchs et al. |
| 2002/0003617 A1 | 1/2002 | Doemens et al. |

(Continued)

FOREIGN PATENT DOCUMENTS

| CN | 1444009 | 9/2003 |
| CN | 101310194 | 11/2008 |

(Continued)

OTHER PUBLICATIONS

"Office Action of Korea Counterpart Application", dated May 7, 2020, with English translation thereof, p. 1-p. 10.
(Continued)

*Primary Examiner* — Daniel L Murphy
(74) *Attorney, Agent, or Firm* — JCIPRNET

(57) ABSTRACT

An optical safety sensor is inexpensively implemented. An optical safety sensor includes: a plurality of light projectors/receivers (a first light projector/receiver and a second light projector/receiver), which includes light projecting portions and light receiving portions; distance measurement portions, which measure distances using the time from light projecting to light receiving; and detection portions, which detect, based on measurement results, an abnormality occurring in any one of the plurality of light projectors/receivers; each of the light receiving portion provided in the plurality of light projectors/receivers receives reflected light caused by the light projected from the light projecting portions of all the plurality of light projectors/receivers.

20 Claims, 7 Drawing Sheets

(51) Int. Cl.
  *G01C 3/08* (2006.01)
  *G01D 5/28* (2006.01)
  *G01S 17/10* (2020.01)
  *G01S 17/88* (2006.01)
  *G01S 7/497* (2006.01)
  *G01S 17/87* (2020.01)
  *G01S 7/481* (2006.01)
  *F16P 3/14* (2006.01)

(52) U.S. Cl.
  CPC ............ *G01S 7/4815* (2013.01); *G01S 7/497* (2013.01); *G01S 17/10* (2013.01); *G01S 17/87* (2013.01); *G01S 17/88* (2013.01); *F16P 3/14* (2013.01); *F16P 3/144* (2013.01)

(58) Field of Classification Search
  USPC .......................................................... 367/127
  See application file for complete search history.

(56) References Cited

U.S. PATENT DOCUMENTS

2014/0333728 A1  11/2014  Navab et al.
2016/0327649 A1  11/2016  Albert et al.

FOREIGN PATENT DOCUMENTS

| EP | 2487504 | 8/2012 | |
| EP | 2708916 | 3/2014 | |
| EP | 2769864 | 8/2014 | |
| EP | 3534181 | 9/2019 | |
| GB | 2101302 A * | 1/1983 | ............ G01D 5/268 |
| JP | 2006064641 | 3/2006 | |
| JP | 2009516157 | 4/2009 | |
| JP | 2013235390 | 11/2013 | |
| JP | 2018017534 | 2/2018 | |
| KR | 20150052469 | 5/2015 | |

OTHER PUBLICATIONS

"Search Report of Europe Counterpart Application", dated Jun. 25, 2019, p. 1-p. 9.
"Office Action of Japan Counterpart Application", dated Jan. 26, 2021, with English translation thereof, p. 1-p. 5.
"Office Action of Taiwan Counterpart Application", dated Aug. 26, 2019, with English translation thereof, p. 1-p. 8.
"Office Action of Taiwan Counterpart Application," dated Feb. 24, 2020, with English translation thereof, p. 1-p. 13.
"Office Action of Europe Counterpart Application", dated Apr. 19, 2022, p. 1-p. 4.
"Office Action of China Counterpart Application" with English translation thereof, dated Nov. 3, 2022, p. 1-p. 13.

* cited by examiner

OPTICAL SAFETY SENSOR

CROSS-REFERENCE TO RELATED APPLICATION

This application claims the priority benefit of Japanese application serial no. 2018-044575, filed on Mar. 12, 2018. The entirety of the above-mentioned patent application is hereby incorporated by reference herein and made a part of this specification.

BACKGROUND OF THE DISCLOSURE

Technical Field

The disclosure relates to an optical safety sensor that measures distances to an object by using a TOF (Time of Flight) method and detects intrusion of the object to a monitoring area from changes of the distances.

Related Art

A sensor is known which uses the TOF method in which time taken from projecting light until receiving reflected light of the projected light is used to measure the distance to the object reflecting the light. In addition, an optical safety sensor is known which uses the TOF method to detect the intrusion of an object to monitoring areas from changes of the distance measurement results (for example, European Laid-Open No. 2315052B). However, in order to meet a safety standard in the optical safety sensor using the TOF method, a configuration to set a test target is necessary. For example, in prior literature 1 (United States Laid-Open No. 2016/0327649A1 (published on Nov. 10, 2016)), a configuration, which includes standard light transmitters and standard light receivers used for executing a safety-related self-test and different from a light transmitter and a light receiver for detecting the intrusion of an object to the monitoring area, is disclosed.

However, in patent literature 1, the standard light transmitter and the standard light receiver are configurations dedicated to self-test and are not used to monitor the monitoring areas, which is a cause of high cost. In addition, a configuration is considered in which the standard light transmitter and the standard light receiver dedicated to self-test are not used and optical safety sensors which monitor the monitoring areas are simply duplexed. According to this configuration, it is possible to continue monitoring even if any one of the sensors fails, but there is a problem that particular abnormality locations cannot be specified when an abnormality occurs.

SUMMARY

One aspect of the disclosure is made in view of problems described above and aims to inexpensively implement the optical safety sensor.

In order to solve the problems described above, the disclosure adopts the following configurations.

That is, an optical safety sensor according to one aspect of the disclosure includes: a plurality of light projectors/receivers, which is provided with light projecting portions projecting light to a monitoring area and light receiving portions receiving reflected light from the monitoring area; a plurality of distance measurement portions, which measures distances to a subject within the monitoring area using time required from the light projecting to the light receiving; and a plurality of detection portions, which detects, based on measurement results obtained by the distance measurement portions, an abnormality occurring in any one of the plurality of light projectors/receivers; wherein one of the light projectors/receivers forms one set with a corresponding one of the distance measurement portions and a corresponding one of the detection portions, and each of the light receiving portions provided in the plurality of light projectors/receivers receives the reflected light caused by the light projected from the light projecting portions of all the plurality of light projectors/receivers.

DESCRIPTION OF THE EMBODIMENTS

Figure 1:
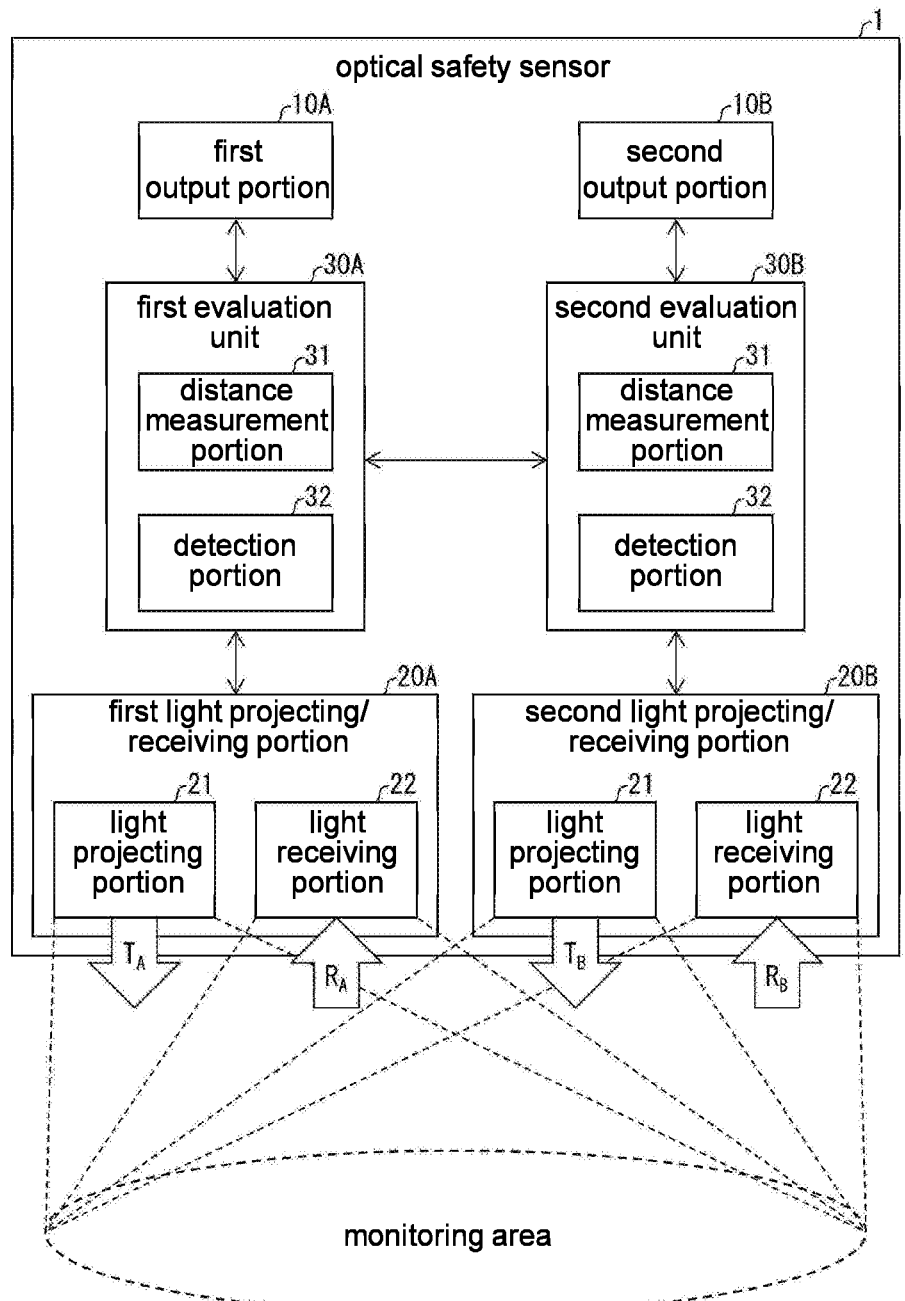
FIG. 1 is a block diagram showing one example of a main part configuration of an optical safety sensor according to embodiment 1 of the disclosure.

An optical safety sensor according to one aspect of the disclosure includes: a plurality of light projectors/receivers, which is provided with light projecting portions projecting light to a monitoring area and light receiving portions receiving reflected light from the monitoring area; a plurality of distance measurement portions, which measures distances to a subject within the monitoring area using time required from the light projecting to the light receiving; and a plurality of detection portions, which detects, based on measurement results obtained by the distance measurement portions, an abnormality occurring in any one of the plurality of light projectors/receivers; wherein one of the light projectors/receivers forms one set with a corresponding one of the distance measurement portions and a corresponding one of the detection portions, and each of the light receiving portions provided in the plurality of light projectors/receivers receives the reflected light caused by the light projected from the light projecting portions of all the plurality of light projectors/receivers.

According to the above-described configuration, the optical safety sensor measures the distances to the subject within the monitoring area by the plurality of light projectors/ receivers, so that even if a malfunction is generated in any one of the light projectors/receivers, normal monitoring can also be continued. In addition, by comparing distance measurement results obtained by each light projector/receiver, an occasion when the malfunction is generated in any one of the light projectors/receivers can be detected. In addition, because commercial modules operating in a TOF method can be used as the light projectors/receivers, compared with the configuration recited in patent literature 1 that uses standard light projectors and standard light receivers dedicated to self-test, the optical safety sensor can be inexpensively implemented.

Furthermore, the projected light from one light projector/receiver can be received in another light projector/receiver, so that the light projecting portion and the light receiving portion of each light projector/receiver are diagnosed to specify the abnormality location when the malfunction occurs.

In the optical safety sensor according to the one aspect, it may be that more than one group consisting of a plurality of light projectors/receivers, which is different from the group consisting of the plurality of light projectors/receivers, is further included, and the monitoring areas which are targets of each of the groups are different; the distance measurement portions switch each of the groups in turn to measure the distances, and the detection portions can switch each group in turn to detect the abnormality. According to this configuration, as for the abnormality diagnosis of the light projectors/receivers included in the plurality of groups with different monitoring areas, the distance measurement and abnormality diagnosis can be carried out by one distance measurement portion and one detection portion. Therefore, by sharing the distance measurement portions and the detection portions, a wider area can be safely monitored while suppressing equipment cost at a low level.

In the optical safety sensor according to the one aspect, it may be that when a measured distance based on the time from the light projecting by a light projecting portion of a first light projector/receiver, which is one light projector/receiver of the plurality of light projectors/receivers, to the light receiving by the light receiving portion of the first light projector/receiver, does not match with a measured distance based on the time from the light projecting by the light projecting portion of a second light projector/receiver, which is different from the first light projector/receiver, to the light receiving by the light receiving portion of the second light projector/receiver, the detection portions determine that the abnormality occurs in any one of the first light projector/receiver and the second light projector/receiver. According to this configuration, by comparing the measured distance based on the time form the light projecting to the light receiving in the first light projector/receiver and the second light projector/receiver, whether the abnormality occurs in any one of the first light projector/receiver and the second light projector/receiver can be determined.

In the optical safety sensor according to the one aspect, it may be configured that when the measured distance based on the time from the light projecting by the light projecting portion of the first light projector/receiver to the light receiving by the light receiving portion of the first light projector/receiver does not match with the measured distance based on the time from the light projecting by the light projecting portion of the second light projector/receiver to the light receiving by the light receiving portion of the first light projector/receiver, the detection portions determine that the abnormality occurs in any one of the light projecting portion of the first light projector/receiver and the light projecting portion of the second light projector/receiver. According to this configuration, whether the abnormality occurs in at least any one of the light projecting portion of the first light projector/receiver and the light projecting portion of the second light projector/receiver can be determined by comparing the measured distances based on the time until specific light receiving portions receive light projected respectively by the plurality of mutually different light projecting portions.

In the optical safety sensor according to the one aspect, it may be that when it is determined that the abnormality occurs in any one of the light projecting portion of the first light projector/receiver and the light projecting portion of the second light projector/receiver, if the difference between the measured distance, which is based on time from light projecting by the light projecting portion of the first light projector/receiver started at a first time T=0 to the light receiving by the light receiving portion of the first light projector/receiver, and the measured distance, which is based on time from the first time T=0 to the light receiving by the light receiving portion of the first light projector/receiver when the light projecting by the light projecting portion of the first light projector/receiver is started after time $\Delta T$ from the first time T=0, is different from the distance difference $\Delta S$ based on the time $\Delta T$, the detection portions determine that the abnormality occurs in the light projecting portion of the first light projector/receiver; and if the difference between the measured distance, which is based on time from the light projecting by the light projecting portion of the second light projector/receiver started at the first time T=0 to the light receiving by the light receiving portion of the first light projector/receiver, and the measured distance, which is based on time from the first time T=0 to the light receiving by the light receiving portion of the first light projector/receiver when the light projecting by the light projecting portion of the second light projector/receiver is started after the time $\Delta T$ from the first time T=0, is different from the distance difference $\Delta S$ based on the time $\Delta T$, the detection portions determine that the abnormality occurs in the light projecting portion of the second light projector/receiver. According to this configuration, the presence or absence of abnormality in the light projecting portion of the first light projector/receiver and the presence or absence of abnormality in the light projecting portion of the second light projector/receiver can be determined separately using the difference between the measured distances based on the time from each of the two times of light projecting with a time interval to the light receiving.

In the optical safety sensor according to the one aspect, it may be that when the measured distance based on the time from the light projecting by the light projecting portion of the first light projector/receiver to the light receiving by the light receiving portion of the first light projector/receiver does not match with the measured distance based on the time from the light projecting by the light projecting portion of the first light projector/receiver to the light receiving by the light receiving portion of the second light projector/receiver, the detection portions determine that the abnormality occurs in any one of the light receiving portion of the first light projector/receiver and the light receiving portion of the second light projector/receiver. According to this configuration, whether the abnormality occurs in at least any one of the light receiving portion of the first light projector/receiver and the light receiving portion of the second light projector/receiver can be determined by comparing the measured distances based on the time for the projected light of the specific light projecting portions being received by each of the plurality of mutually different light receiving portions.

In the optical safety sensor according to the one aspect, it may be that when it is determined that the abnormality occurs in any one of the light receiving portion of the first light projector/receiver and the light receiving portion of the second light projector/receiver, if the difference between the measured distance, which is based on the time from the light projecting by the light projecting portion of the first light projector/receiver started at the first time T=0 to the light receiving by the light receiving portion of the first light projector/receiver, and the measured distance, which is based on time from the first time T=0 to the light receiving by the light receiving portion of the first light projector/receiver when the light projecting by the light projecting portion of the first light projector/receiver is started after time ΔT from the first time T=0, is different from the distance difference ΔS based on the time ΔT, the detection portions determine that the abnormality occurs in the light receiving portion of the first light projector/receiver; and if the difference between the measured distance, which is based on time from the light projecting by the light projecting portion of the first light projector/receiver started at the first time T=0 to the light receiving by the light receiving portion of the second light projector/receiver, and the measured distance, which is based on time from the first time T=0 to the light receiving by the light receiving portion of the second light projector/receiver when the light projecting by the light projecting portion of the first light projector/receiver is started after the time ΔT from the first time T=0, is different from the distance difference ΔS based on the time ΔT, the detection portions determine that the abnormality occurs in the light receiving portion of the second light projector/receiver. According to this configuration, the presence or absence of abnormality in the light receiving portion of the first light projector/receiver and the presence or absence of abnormality in the light receiving portion of the second light projector/receiver can be determined separately using the difference between the measured distances based on the time from each of the two times of light projecting with a time interval to the light receiving.

In the optical safety sensor according to the one aspect, when a detection result in one of the detection portions which forms one set with the first light projector/receiver and a detection result in another one of the detection portions which forms one set with the second light projector/receiver are compared with one another, and detection results are different from one another, an error may be output. According to this configuration, the detection result of the first light projector/receiver and the detection result of the second light projector/receiver can be compared with one another. When the detection results are different from one another, it is considered that the abnormality occurs in at least any one of the detection results, so that the error is output on such an occasion, by which the presence or absence of abnormality can be determined with higher accuracy.

According to one aspect of the disclosure, the optical safety sensor can be inexpensively implemented.

1 Application Example

Figure 2:
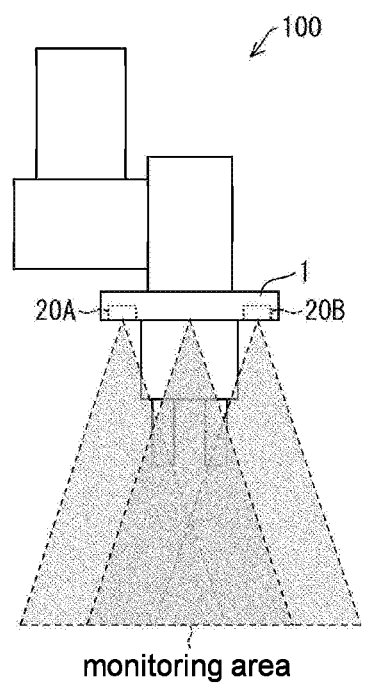
FIG. 2 is a schematic diagram showing one example of an application case of the optical safety sensor according to an application example of the disclosure.

At first, one example of cases in which the disclosure is applied is described using FIG. 2. FIG. 2 schematically illustrates one example of an application case of an optical safety sensor 1 of the embodiment. The optical safety sensor 1 of the embodiment is used to set regions containing work ranges where a robot arm 100 works as monitoring areas and to prevent a user who intrudes the monitoring areas from colliding with the robot arm 100.

As shown in FIG. 2, the optical safety sensor 1 monitors the regions including the work range of the robot arm 100 as the monitoring area. If the optical safety sensor 1 detects that an object intrudes into the monitoring area from a change of distance measured using the TOF method, a detection result is transmitted to the robot arm 100. If the robot arm 100 receives the detection result from the optical safety sensor 1, movement of the object itself is slowed down or stopped so that the object does not collide.

The optical safety sensor 1 includes at least two light projectors/receivers that project light to the same monitoring area and receive reflected light from the monitoring area. The optical safety sensor 1 determines whether there is an abnormality based on distances to the monitoring area which are calculated respectively by a first light projector/receiver 20A and a second light projector/receiver 20B of the at least two light projectors/receivers. When the optical safety sensor 1 determines that the abnormality occurs, the optical safety sensor 1 diagnoses abnormality contents. Particularly, the optical safety sensor 1 executes the next light projecting from at least any one of the first light projector/receiver 20A and the second light projector/receiver 20B after a fixed period of time elapsed, and specifies an abnormality location based on the distance to the monitoring area measured from this next light projecting and light receiving of the reflected light thereof. The optical safety sensor 1 transmits a diagnosis result to the robot arm 100, and the robot arm 100 performs operations corresponding to the diagnosis results. For example, the specified abnormality location of the optical safety sensor 1 may be output using an output device such as an operation panel of the robot arm 100, or the like.

The optical safety sensor 1 can use the at least two light projectors/receivers to measure the distance to the monitoring area and the object intruding the monitoring area in the TOF method. Besides, in the optical safety sensor 1, light projecting and light receiving can be executed dividedly between the first light projector/receiver 20A and the second light projector/receiver 20B. In this way, for example, whether there is an abnormality in the light projecting and the light receiving in each light projector/receiver can be checked, and when an abnormality occurs, the location where the abnormality occurs can be specified. In addition, commercial modules which operate in the TOF method can be used as the light projectors/receivers, so that compared with a configuration recited in patent literature 1 that uses standard light projectors and standard light receivers dedicated to self-test, the optical safety sensor 1 can be inexpensively implemented. Therefore, the inexpensive optical safety sensor 1 with high security which suppresses the occurrence of abnormality in the monitoring to the monitoring area caused by the abnormality of the light projectors/receivers can be implemented.

2 Configuration Example

Next, one embodiment of the disclosure is described in detail using FIG. 1, FIG. 3-FIG. 7.
(Configuration of Optical Safety Sensor)

A summary and a configuration of the optical safety sensor 1 according to one aspect of the disclosure are described using FIG. 1. FIG. 1 is a block diagram showing one example of a main part configuration of the optical safety sensor 1. The optical safety sensor 1 includes a first output portion 10A, a second output portion 10B, the first light projector/receiver 20A, the second light projector/ receiver 20B, a first evaluation unit 30A, and a second evaluation unit 30B. The first light projector/receiver 20A and the second light projector/receiver 20B include identical light projecting portions 21 and light receiving portions 22, and the first evaluation unit 30A and the second evaluation unit 30B include identical distance measurement portions 31 and detection portions 32. Furthermore, in the optical safety sensor 1, one light projector/receiver forms one set with the corresponding evaluation unit and output portion. In the example shown in the diagram, the first light projector/receiver 20A forms one set with the first evaluation unit 30A and the first output portion 10A, and the second light projector/receiver 20B forms one set with the second evaluation unit 30B and the second output portion 10B.

The optical safety sensor 1 can activate the first light projector/receiver 20A and the second light projector/receiver 20B according to instructions of the first evaluation unit 30A and the second evaluation unit 30B. The optical safety sensor 1 is, for example, mounted to the robot arm 100 as one portion of the robot arm 100 shown in FIG. 2 to operate.

The first output portion 10A outputs information received from the first evaluation unit 30A, and the second output portion 10B outputs information received from the second evaluation unit 30B. For example, the first output portion 10A obtains, from the first evaluation unit 30A, a diagnosis result of an abnormality diagnosis which is carried out by the first evaluation unit 30A to at least any one of the first light projector/receiver 20A and the second light projector/receiver 20B, and outputs the diagnosis result to the outside. Furthermore, the first output portion 10A and the second output portion 10B may be indicators which notify contents of the information received from each evaluation unit by flashing of LEDs or the like.

The first light projector/receiver 20A and the second light projector/receiver 20B are modules which operate according to the instructions of the first evaluation unit 30A and the second evaluation unit 30B. Particularly, light is projected from the light projecting portions 21 to the monitoring area, and the reflected light reflected in the monitoring area is received by the light receiving portions 22. The first light projector/receiver 20A and the second light projector/receiver 20B transmit the information related to light projecting and light receiving carried out by themselves to the first evaluation unit 30A and the second evaluation unit 30B. In the example shown in the diagram, the first light projector/receiver 20A and the second light projector/receiver 20B have a configuration including the identical light projecting portions 21 and light receiving portions 22, but they can also have a configuration including mutually different light projecting portions and light receiving portions.

In the example shown in the diagram, the light which is projected by the first light projector/receiver 20A to the monitoring area using the light projecting portion 21 is set as $T_A$, and the reflected light which is received by the first light projector/receiver 20A from the monitoring area using the light receiving portion 22 is set as $R_A$. Similarly, the light which is projected by the second light projector/receiver 20B to the monitoring area using the light projecting portion 21 is set as $T_B$, and the reflected light which is received by the second light projector/receiver 20B from monitoring area using the light receiving portion 22 is set as $R_B$. Furthermore, it should be noted that reflected light of $T_B$ may be included in $R_A$, and similarly reflected light of $T_A$ may be included in $R_B$.

The first evaluation unit 30A and the second evaluation unit 30B integrally control each portion of the optical safety sensor 1. Each of the first evaluation unit 30A and the second evaluation unit 30B uses the distance measurement portion 31 to calculate (measure) measured distance from the optical safety sensor 1 to the monitoring area from data obtained by activating the first light projector/receiver 20A and the second light projector/receiver 20B measured distance. Then, the abnormality diagnosis by the detection portion 32 is carried out based on measurement results. In addition, the first evaluation unit 30A and the second evaluation unit 30B can transmit and receive information when necessary. For example, when the light receiving portion 22 of the second light projector/receiver 20B receives the reflected light of the light projected by the light projecting portion 21 of the first light projector/receiver 20A, the first evaluation unit 30A may obtain information related to the light receiving of the second light projector/receiver 20B from the second evaluation unit 30B. Conversely, the second evaluation unit 30B_may obtain information related to the light projecting of the first light projector/receiver 20A from the first evaluation unit 30A. Then, the first evaluation unit 30A and the second evaluation unit 30B mutually compare a detection result (a diagnosis result) of the detection portion 32 that forms one set with the first light projector/receiver 20A with a detection result of the detection portion 32 that forms one set with the second light projector/receiver 20B. That is, the first evaluation unit 30A and the second evaluation unit 30B carry out the same abnormality diagnosis to one combination of the light projecting and the light receiving and compare the diagnosis results, thereby determine whether there is a failure in the evaluation units. If the diagnosis results are the same in the mutual comparison, the first evaluation unit 30A and the second evaluation unit 30B transmit and output the diagnosis results to each of the first output portion 10A and the second output portion 10B. On the other hand, when the diagnosis results are different from one another, an error is transmitted and output to each of the first output portion 10A and the second output portion 10B.

The distance measurement portions 31 measure distances to a subject within the monitoring area using time required from the light projecting to the light receiving. Particularly, if the distance measurement portions 31 receive the information related to the light projecting and the light receiving from at least any one of the first light projector/receiver 20A and the second light projector/receiver 20B, the distance measurement portions 31 calculate the measured distances from the optical safety sensor 1 to the monitoring area using the received information. Furthermore, the distance measurement portions 31 can also receive information related to light projecting and light receiving via an evaluation unit different from the evaluation unit including the distance measurement portions 31 themselves. An occasion when the light projecting portion 21 of the first light projector/receiver 20A projects the light $T_A$ and the light receiving portion 22 of the first light projector/receiver 20A receives the reflected light $R_A$ of the projected light is considered. On this occasion, the distance measurement portions 31 use a time t which is from a starting time of light projecting of the light $T_A$ to a starting time of light receiving of the reflected light $R_A$ and a light speed c to calculate a distance S from the optical safety sensor 1 to the monitoring area. Furthermore, in the following description, S=R(T) represents the distance from the optical safety sensor 1 to the monitoring area, which is calculated using a starting time of light projecting of the light T and a starting time of light receiving of the reflected light R. That is, when the light projecting portion 21 of the first light projector/receiver 20A projects the light $T_A$, and the light receiving portion 22 of the first light projector/receiver 20A receives the reflected light $R_A$ of the projected light, the distance measurement portion 31 calculates $S=R_A(T_A)$. In addition, the distance measurement portion 31 of the first evaluation unit 30A and the distance measurement portion 31 of the first evaluation unit 30B calculate measured distance respectively for one combination of light projecting and light receiving. Then, the distance measurement portion 31 of the first evaluation unit 30A transmits the calculated distance to the detection portion 32 of the first evaluation unit 30A, and the distance measurement portion 31 of the first evaluation unit 30B transmits the calculated distance to the detection portion 32 of the second evaluation unit 30B.

The detection portions 32 detect, based on the measurement results of the distance measurement portions 31, the abnormality occurs in the first light projector/receiver 20A or the second light projector/receiver 20B. More particularly, the detection portions 32 compare plural distances which are measured by the distance measurement portions 31 under various combinations of the light projecting portion 21 and the light receiving portion 22 which are included in the first light projector/receiver 20A and the light projecting portion 21 and the light receiving portion 22 which are included in the second light projector/receiver 20B, and detect the abnormality. Furthermore, the comparison of the plural distances are carried out respectively by both of the detection portion 32 of the first evaluation unit 30A and the detection portion 32 of the second evaluation unit 30B.

(Abnormality Diagnosis According to Control of Light Projecting Timing)

Figure 3:
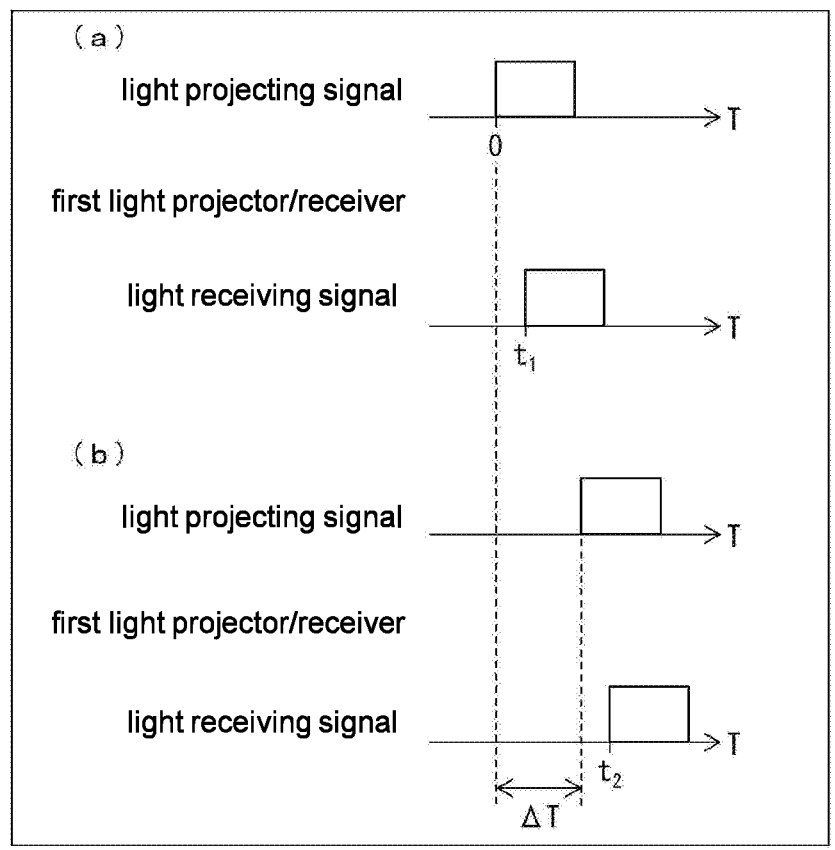
FIG. 3 is a time chart showing one example of control of light projecting carried out by a first light projector/receiver in an abnormality diagnosis in an optical safety sensor 1 according to embodiment 1 of the disclosure, (a) of FIG. 3 shows that the light projecting starts at a first time T=0, and (b) of FIG. 3 shows that next light projecting starts after time ΔT from the first time T=0.

A method in which the optical safety sensor 1 of the embodiment controls the light projecting timing to carry out the abnormality diagnosis is described using FIG. 3. FIG. 3 is a time chart showing one example of control of the light projecting which is carried out by the first light projector/receiver 20A at the time of the abnormality diagnosis in the optical safety sensor 1. (a) of FIG. 3 shows that the light projecting starts at a first time T=0, and (b) of FIG. 3 shows that the next light projecting starts after time ΔT from the first time T=0.

As shown in (a) of FIG. 3, the first light projector/receiver 20A uses the light projecting portion 21 to start the light projecting based on a light projecting signal at the first time T=0. At the same time of the light projecting, the first light projector/receiver 20A uses the light receiving portion 22 to receive the reflected light of the projected light and detects the reflected light as a light receiving signal. Corresponding to the distance between the optical safety sensor 1 and the monitoring area, the timing of starting to detect the light receiving signal is delayed from the first time T=0. In the example shown in the diagram, the light receiving portion 22 of the first light projector/receiver 20A starts the light receiving at a time $T=t_1$. The optical safety sensor 1 calculates, by the distance measurement portion 31, the distance $S_1$ between the optical safety sensor 1 and the monitoring area based on the time from the first time T=0 when the light projecting is started to the time $T=t_1$ when the reflected light of the projected light is detected initially as the receiving signal.

As shown in (b) of FIG. 3, after (a) of FIG. 3, the first light projector/receiver 20A uses the light projecting portion 21 after time ΔT from the first time T=0 to start the light projecting based on the light projecting signal. AT is preferably a very small value with respect to the flight time of the light, for example, several nanoseconds. In (b) of FIG. 3, the starting time of the light projecting changes with respect to (a) of FIG. 3, so that the starting time of the light receiving also changes to a time $T=t_2$. The optical safety sensor 1 calculates, by the distance measurement portion 31, the distance $S_2$ between the optical safety sensor 1 and the monitoring area based on the time from the first time T=0 to the time $T-t_2$ when the reflected light of the projected light is detected initially as the receiving signal.

Then, the detection portions 32 of the optical safety sensor 1 determine whether a difference between the distance S1 and the distance S2 is equal to a distance difference ΔS based on the time ΔT, and if it is equal, a determination is made that no abnormality occur in any one of the light projecting portion 21 and the light receiving portion 22 of the first light projector/receiver 20A. That is, when the abnormality occurs in any one of the light projecting portion 21 and the light receiving portion 22 of the first light projector/receiver 20A, the detection portion 32 makes a determination according to the fact that due to the abnormality the difference between the distance $S_1$ and the distance $S_2$ does not match with a theoretical distance difference ΔS based on the time ΔT.

Furthermore, in the above-described description, the light projecting portion 21 and the light receiving portion 22 of the first light projector/receiver 20A are used, and it is evident that the light projecting portion 21 and the light receiving portion 22 can be combined in any manner. The optical safety sensor 1 applies the above-described method to some combinations related to the light projecting portion 21 and the light receiving portion 22, and specifies a location where the abnormality occurs.

(Flow of Diagnosis Processing)

Figure 4:
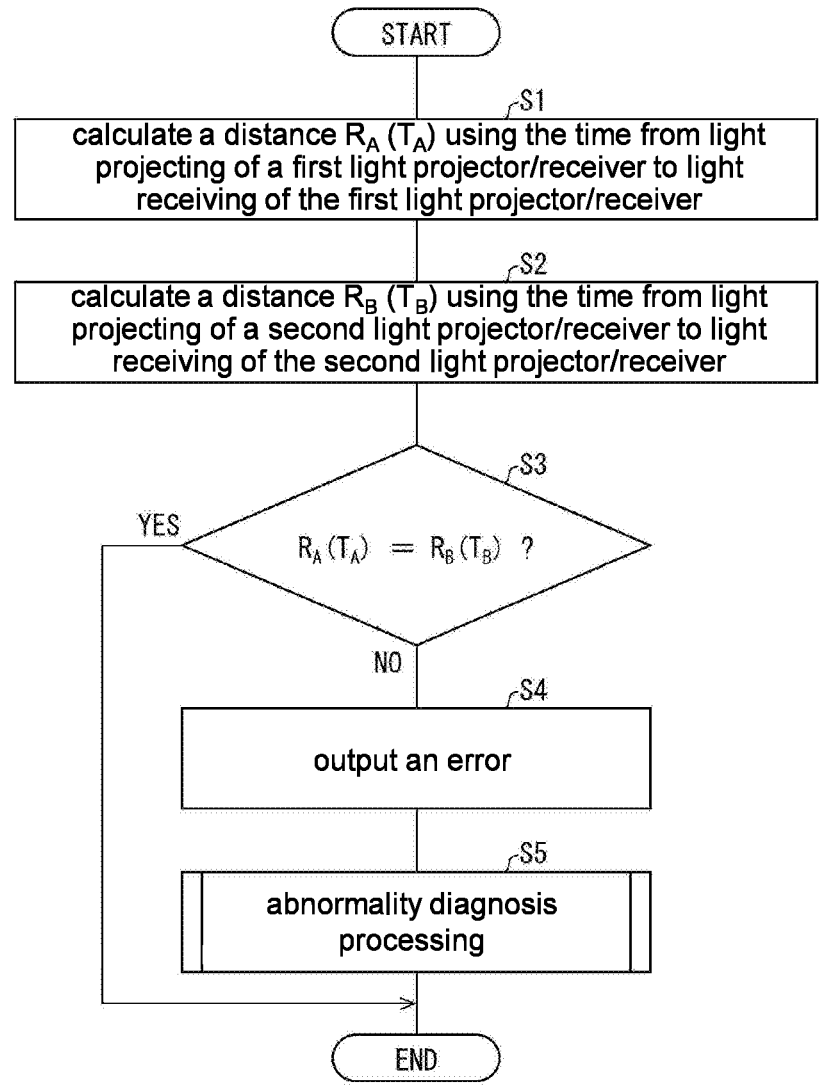
FIG. 4 is a flowchart showing one example of a flow of a diagnosis processing which is executed by the optical safety sensor according to embodiment 1 of the disclosure.

A flow of the diagnosis processing which is executed by the optical safety sensor 1 of the embodiment is described using FIG. 4. FIG. 4 is a flowchart showing one example of the flow of the diagnosis processing which is executed by the optical safety sensor 1.

At first, the first evaluation unit 30A instructs the first light projector/receiver 20A to project light. The first light projector/receiver 20A which accepts the instruction uses the light projecting portion 21 to project the light $T_A$ to the monitoring area, and receives the reflected light $R_A$ of the projected light by the light receiving portion 22. The first light projector/receiver 20A transmits data which includes the starting time of the light projecting and the starting time of the light receiving to the distance measurement portion 31 of the first evaluation unit 30A. On receiving the data from the first light projector/receiver 20A, the distance measurement portion 31 calculates the distance $R_A$ ($T_A$) using the time required by the first light projector/receiver 20A from the starting of the light projecting to the light receiving (S1). The distance measurement portion 31 transmits the calculated distance $R_A$ ($T_A$) to the detection portion 32.

Next, the second evaluation unit 30B instructs the second light projector/receiver 20B to project light. The second light projector/receiver 20B which accepts the instruction uses the light projecting portion 21 to project the light $T_B$ to the monitoring area, and receives the reflected light $R_B$ of the projected light by the light receiving portion 22. The second light projector/receiver 20B transmits data which includes the starting time of the light projecting and the starting time of the light receiving to the distance measurement portion 31 of the second evaluation unit 30B. On receiving the data from the second light projector/receiver 20B, the distance measurement portion 31 calculates the distance $R_B$ ($T_B$) using the time required by the second light projector/receiver 20B from the starting of the light projecting to the light receiving (S2). The distance measurement portion 31 transmits the calculated distance $R_B$ ($T_B$) to the detection portion 32.

Then, the detection portions 32 of the first evaluation unit 30A and the second evaluation unit 30B determine whether the distance $R_A$ ($T_A$) calculated by the distance measurement portion 31 of the first evaluation unit 30A is equal to the distance $R_B$ ($T_B$) calculated by the distance measurement portion 31 of the second evaluation unit 30B (S3). If it is determined to be equal ("YES" in S3), the detection portions 32 determine that the monitoring to the monitoring area has no problem. Then, the optical safety sensor 1 ends the series of processing.

On the other hand, if it is determined that the distance $R_A$ ($T_A$) is not equal to the distance $R_B$($T_B$) in S3 ("NO" in S3), the detection portions 32 of the first evaluation unit 30A and the second evaluation unit 30B output an error (S4). Then, the optical safety sensor 1 executes an abnormality diagnosis processing described later (S5). After the abnormality diagnosis process is executed, the optical safety sensor 1 ends the series of processing.

(Abnormality Diagnosis Processing)

Figure 5:
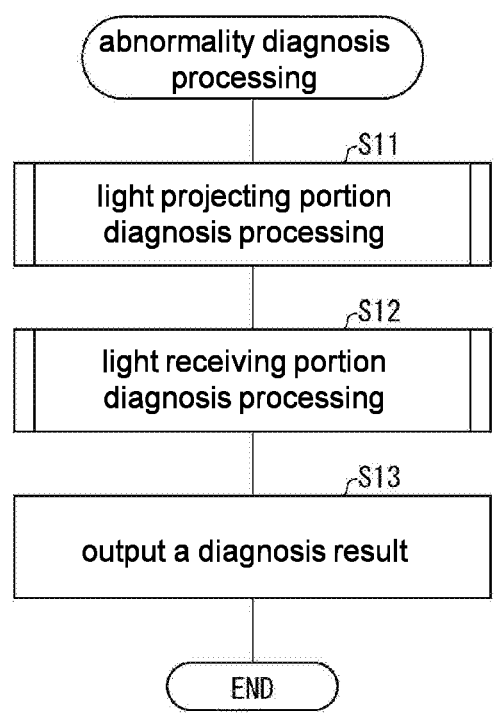
FIG. 5 is a flowchart showing one example of a flow of a processing executed in an abnormality diagnosis processing by the optical safety sensor according to embodiment 1 of the disclosure.

The flow of the abnormality diagnosis processing executed by the optical safety sensor 1 of the embodiment is described using FIG. 5. FIG. 5 is a flowchart showing one example of the flow of the abnormality diagnosis processing executed by the optical safety sensor 1.

At first, the optical safety sensor 1 executes a light projecting portion diagnosis processing described later, and diagnoses whether an abnormality occurs in the light projecting portions 21 provided respectively on the first light projector/receiver 20A and the second light projector/receiver 20B (S11).

Then, the optical safety sensor 1 executes a light receiving portion diagnosis processing described later, and diagnoses whether an abnormality occurs in the light receiving portions 22 provided respectively on the first light projector/receiver 20A and the second light projector/receiver 20B (S12).

Then, the detection portions 32 of the first evaluation unit 30A and the second evaluation unit 30B summarize the diagnosis results in each of the light projecting portion diagnosis processing (S11) and the light receiving portion diagnosis processing (S12). After that, the detection portions 32 output the summarized results to the first output portion 10A and the second output portion 10B (S13). After that, the processing transits to a caller of the abnormality diagnosis processing.

(Light Projecting Portion Diagnosis Processing)

Figure 6:
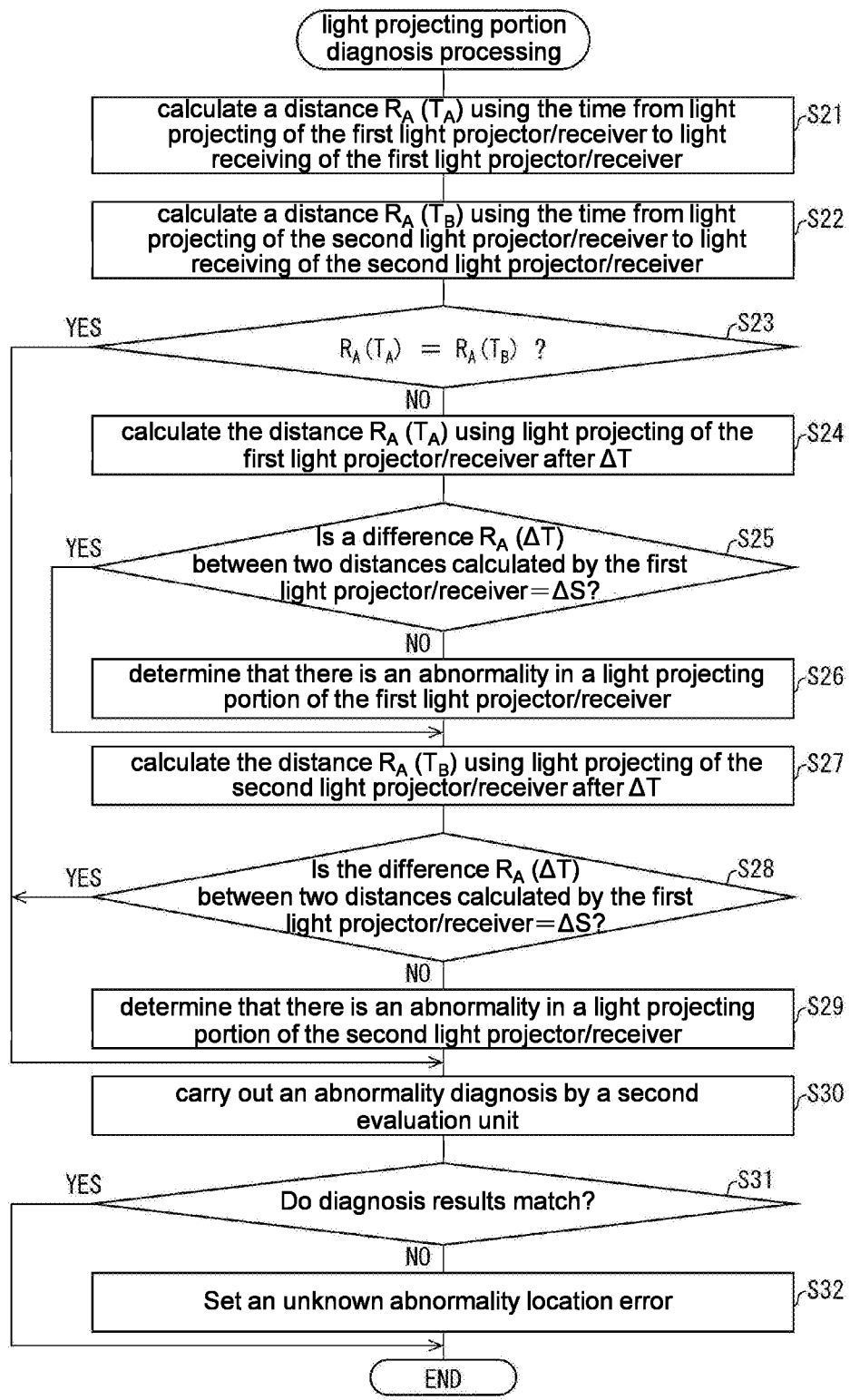
FIG. 6 is a flowchart showing one example of a flow of a processing executed in a light projecting portion diagnosis processing by the optical safety sensor according to embodiment 1 of the disclosure.

A flow of the light projecting portion diagnosis processing executed by the optical safety sensor 1 of the embodiment is described using FIG. 6. FIG. 6 is a flowchart showing one example of the flow of the light projecting portion diagnosis processing executed by the optical safety sensor 1.

At first, a processing similar to S1 in FIG. 4 is executed and the distance $R_A$ ($T_A$) is calculated. That is, the first light projector/receiver 20A, which accepts the light projecting instruction from the first evaluation unit 30A, projects the light $T_A$ and receives the reflected light $R_A$ of the projected light. The first light projector/receiver 20A transmits the data which includes the starting time of the light projecting and the starting time of the light receiving to the distance measurement portion 31 of the first evaluation unit 30A. On receiving the data from the first light projector/receiver 20A, the distance measurement portion 31 of the first evaluation unit 30A calculates the measured distance $R_A$ ($T_A$) based on the time taken by the first light projector/receiver 20A from the starting of the light projecting to the light receiving (S21).

Next, the second evaluation unit 30B instructs the second light projector/receiver 20B to project light. The second light projector/receiver 20B which accepts the instruction projects the light $T_B$ to the monitoring area. Then, the first light projector/receiver 20A receives the reflected light $R_A$ by the light receiving portion 22. The distance measurement portion 31 of the first evaluation unit 30A acquires the starting time of the light projecting from the second light projector/receiver 20B via the second evaluation unit 30B, and acquires the starting time of the light receiving from the first light projector/receiver 20A. After that, the distance measurement portion 31 of the first evaluation unit 30A calculates the measured distance $R_A$ ($T_B$) based on the time from the light projecting of the light $T_B$ by the light projecting portion 21 of the second light projector/receiver 20B to the light receiving of the reflected light $R_A$ by the light receiving portion 22 of the first light projector/receiver 20A (S22).

After S22, the detection portion 32 of the first evaluation unit 30A determines whether the distance $R_A$ ($T_A$) calculated in S21 matches with the distance $R_A$($T_B$) calculated in S22 (S23). If it is determined to be matched ("YES" in S23), the detection portion 32 determines that no abnormality occurs in the light projecting portion 21 of the first light projector/receiver 20A and the light projecting portion 21 of the second light projector/receiver 20B. Then, the processing proceeds to S30.

On the other hand, if it is determined in S23 that the distance $R_A$ ($T_A$) does not match with the distance $R_A$ ($T_B$) ("NO" in S23), the detection portion 32 determines that the abnormality occurs in at least any one of the light projecting portion 21 of the first light projector/receiver 20A and the light projecting portion 21 of the second light projector/receiver 20B. Then, the first evaluation unit 30A sets the time when the light projecting portion 21 of the first light projector/receiver 20A starts the light projecting in S21 as the first time T=0, and instructs the first light projector/receiver 20A to restart the light projecting after time ΔT from the first time T=0. The first light projector/receiver 20A which accepts the instruction projects the light $T_A$ to the monitoring area. Then, the first light projector/receiver 20A receives the reflected light $R_A$ by the light receiving portion 22. The distance measurement portion 31 of the first evaluation unit 30A calculates the measured distance $R_A$ ($T_A$) based on the time from the first time T=0 to the light receiving (S24).

After that, the detection portion 32 of the first evaluation unit 30A determines whether the difference $R_A$ (ΔT) between the distance $R_A$ ($T_A$) calculated in S21 and the measured distance $R_A$ ($T_A$) calculated using the light projecting after time ΔT matches with the distance difference ΔS based on time ΔT (S25). The calculation of the $R_A$ (ΔT) is carried out by the method described using FIG. 3. If it is determined that the $R_A$ (ΔT) matches with the ΔS ("YES" in S25), the detection portion 32 determines that no abnormality occurs in the light projecting portion 21 of the first light projector/receiver 20A, and the processing proceeds to S27. On the other hand, if it is determined that the $R_A$ (ΔT) does not match with the ΔS ("NO" in S25), the detection portion 32 determines that the abnormality occurs in the light projecting portion 21 of the first light projector/receiver 20A (S26). After that, the processing proceeds to S27.

In S27, the second evaluation unit 30B sets the time when the light projecting portion 21 of the second light projector/receiver 20B starts the light projecting in S22 as the first time T=0, and instructs the second light projector/receiver 20B to restart the light projecting at time ΔT after the first time T=0. The first light projector/receiver 20B which accepts the instruction projects the light $T_B$ to the monitoring area. Then, the first light projector/receiver 20A receives the reflected light $R_A$ by the light receiving portion 22. Similar to S22, the distance measurement portion 31 of the first evaluation unit 30A calculates the measured distance $R_A$ ($T_B$) based on the time from the second light projector/receiver 20B starting the light projecting after time ΔT to the first light projector/receiver 20A receiving the light (S27).

After that, the detection portion 32 of the first evaluation unit 30A determines whether the difference $R_A$ (ΔT) between the distance $R_A$ ($T_B$) calculated in S22 and the measured distance $R_A$ ($T_B$) based on the time from the light projecting after time ΔT to the light receiving matches with the distance difference ΔS based on the time ΔT (S28). If it is determined that the $R_A$ (ΔT) matches with the ΔS ("YES" in S28), the detection portion 32 determines that no abnormality occurs in the light projecting portion 21 of the second light projector/receiver 20B. After that, the optical safety sensor 1 ends the light projecting portion diagnosis processing, and transits to the caller of the light projecting portion diagnosis processing with the diagnosis results up to the moment. On the other hand, when it is determined that the $R_A$ (ΔT) does not match with the ΔS ("NO" in S28), the detection portion 32 determines that the abnormality occurs in the light projecting portion 21 of the second light projector/receiver 20B (S29). After that, the processing proceeds to S30.

In S30, the second evaluation unit 30B executes a processing similar to contents executed by the first evaluation unit 30A in S21-S29, and carries out abnormality diagnosis for the light projecting portion 21 of the first light projector/receiver 20A and the light projecting portion 21 of the second light projector/receiver 20B (S30). That is, the second evaluation unit 30B calculates and compares the two measured distances $R_A$ ($T_A$) and $R_A$ ($T_B$), and compares the measured distance $R_A$ (ΔT) calculated using the light projecting after time ΔT with the distance difference ΔS if the $R_A$ ($T_A$) and the $R_A$ ($T_B$) do not match. Then, the second evaluation unit 30B determines from the comparison result whether an abnormality occurs in the light projecting portion 21 of the first light projector/receiver 20A and the light projecting portion 21 of the second light projector/receiver 20B. After that, the first evaluation unit 30A and the second evaluation unit 30B determine whether the result diagnosed by the first evaluation unit 30A according to the processing of S21-S29 matches with the result diagnosed by the second evaluation unit 30B in S30 (S31). If it is determined to be matched ("YES" in S31), the optical safety sensor 1 ends the light projecting portion diagnosis processing and transits to the caller of the light projecting portion diagnosis processing with the diagnosis results up to the moment. On the other hand, if it is determined to be unmatched ("NO" in S31), the optical sensor 1 sets an error indicating that the location where the abnormality occurs is unknown (S32), and transits to the caller of the light projecting portion diagnosis processing.

Furthermore, the projected and received light used by the first evaluation unit 30A for the diagnosis and the projected and received light used by the second evaluation unit 30B for the diagnosis are the same. In other words, the first evaluation unit 30A and the second evaluation unit 30B execute the processing of S21-S29 and the processing of S30 respectively with the same timing. Besides, diagnosis results in each evaluation unit are compared in S31. In this way, the optical safety sensor 1 can carries out the abnormality diagnosis on the light projecting portions with accuracy higher than the configuration in which there is one evaluation unit.

(Light Receiving Portion Diagnosis Processing)

Figure 7:
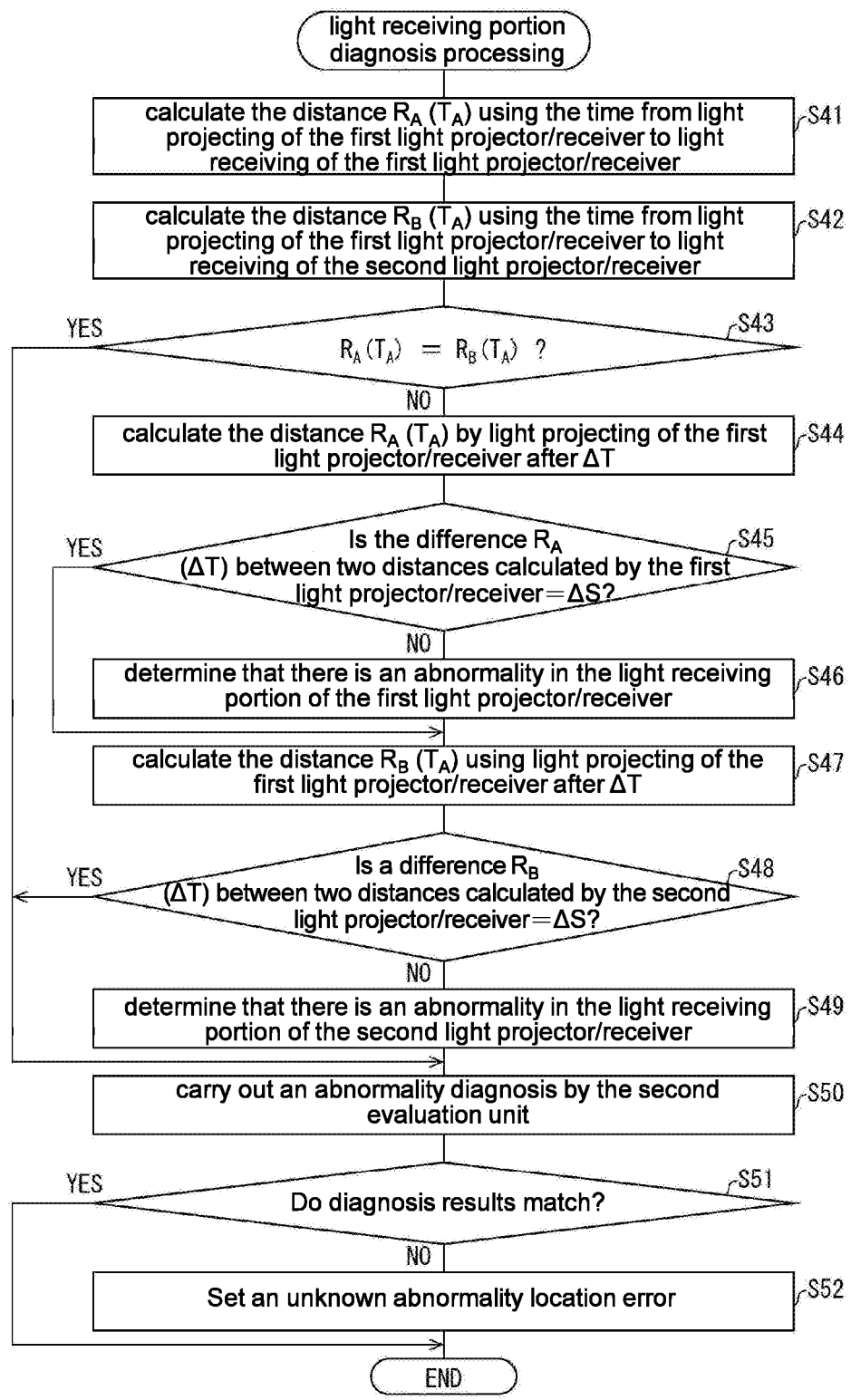
FIG. 7 is a flowchart showing one example of a flow of a processing executed in a light receiving portion diagnosis processing by the optical safety sensor according to embodiment 1 of the disclosure.

A flow of the light receiving portion diagnosis processing executed by the optical safety sensor 1 of the embodiment is described using FIG. 7. FIG. 7 is a flowchart showing one example of the flow of the light receiving portion diagnosis processing executed by the optical safety sensor 1.

At first, a processing similar to S1 in FIG. 4 is executed and the distance $R_A$ ($T_A$) is calculated (S41). Next, the first evaluation unit 30A instructs the first light projector/receiver 20A to project light. The first light projector/receiver 20A which accepts the instruction projects the light $T_A$ to the monitoring area. Then, the second light projector/receiver 20B receives the reflected light $R_B$ by the light receiving portion 22. The distance measurement portion 31 of the first evaluation unit 30A acquires the starting time of the light projecting from the first light projector/receiver 20A, and acquires the starting time of the light receiving from the second light projector/receiver 20B via the second evaluation unit 30B. After that, the distance measurement portion 31 calculates the measured distance $R_B$ ($T_A$) based on the time from the light projecting of the light $T_A$ by the light projecting portion 21 of the first light projector/receiver 20A to the light receiving of the reflected light $R_B$ by the light receiving portion 22 of the second light projector/receiver 20B (S42).

After S42, the detection portion 32 of the first evaluation unit 30A determines whether the distance $R_A$ ($T_A$) calculated in S41 matches with the distance $R_B$ ($T_A$) calculated in S42 (S43). If it is determined to be matched ("YES" in S43), the detection portion 32 determines that no abnormality occurs in the light projecting portion 22 of the first light projector/receiver 20A and the light projecting portion 22 of the second light projector/receiver 20B. After that, the processing proceeds to S50.

On the other hand, if it is determined in S43 that the distance $R_A$ ($T_A$) does not match with the distance $R_B$ ($T_A$) ("NO" in S43), the detection portion 32 determines that the abnormality occurs in at least any one of the light projecting portion 22 of the first light projector/receiver 20A and the light projecting portion 22 of the second light projector/receiver 20B. Then, the first evaluation unit 30A sets the time when the light projecting portion 21 of the first light projector/receiver 20A starts the light projecting in S41 as the first time T=0, and instructs the first light projector/receiver 20A to restart the light projecting after time ΔT from the first time T=0. The first light projector/receiver 20A which accepts the instruction projects the light $T_A$ to the monitoring area. Then, the first light projector/receiver 20A receives the reflected light $R_A$ by the light receiving portion 22. The distance measurement portion 31 of the first evaluation unit 30A calculates the measured distance $R_A$ ($T_A$) based on the time taken by the first light projector/receiver 20A from the starting of the light projecting after time ΔT to the light receiving (S44).

After that, the detection portion 32 of the first evaluation unit 30A determines whether the difference $R_A$ (ΔT) between the distance $R_A$ ($T_A$) calculated in S41 and the measured distance $R_A$ ($T_A$) based on the time from the light projecting after time ΔT to the light receiving matches with the distance difference ΔS based on time ΔT (S45). If it is determined that the $R_A$ (ΔT) matches with the ΔS ("YES" in S45), the detection portion 32 determines that no abnormality occurs in the light projecting portion 22 of the first light projector/receiver 20A, and the processing proceeds to S47. On the other hand, if it is determined that the $R_A$ ($\Delta T$) does not match with the $\Delta S$ ("NO" in S45), the detection portion 32 determines that the abnormality occurs in the light projecting portion 22 of the first light projector/receiver 20A (S46). After that, the processing proceeds to S47.

In S47, the first evaluation unit 30A sets the time when the light projecting portion 21 of the first light projector/receiver 20A starts the light projecting in S42 as the first time T=0, and instructs the first light projector/receiver 20A to restart the light projecting after time $\Delta T$ from the first time T=0. The first light projector/receiver 20A which accepts the instruction projects the light $T_A$ to the monitoring area. Then, the second light projector/receiver 20B receives the reflected light $R_B$ by the light receiving portion 22. The distance measurement portion 31 of the first evaluation unit 30A calculates the measured distance $R_B$ ($T_A$) based on the time from the first light projector/receiver 20A starting the light projecting after time $\Delta T$ to the second light projector/receiver 20B receiving the light (S47).

After that, the detection portion 32 of the first evaluation unit 30A determines whether the difference $R_B$ ($\Delta T$) between the distance $R_B$ ($T_A$) calculated in S42 and the measured distance $R_B$ ($T_A$) based on the time from the light projecting after time $\Delta T$ to the light receiving matches with the distance difference $\Delta S$ based on the time $\Delta T$ (S48). If it is determined that the $R_B$ ($\Delta T$) matches with the $\Delta S$ ("YES" in S48), the detection portion 32 determines that no abnormality occurs in the light projecting portion 22 of the second light projector/receiver 20B. After that, the processing proceeds to S50. On the other hand, when it is determined that the Re ($\Delta T$) does not match with the $\Delta S$ ("NO" in S48), the detection portion 32 determines that the abnormality occurs in the light projecting portion 22 of the second light projector/receiver 20B (S49). After that, the processing proceeds to S50.

In S50, the second evaluation unit 30B executes a processing similar to contents executed by the first evaluation unit 30A in S41-S49, and carries out abnormality diagnosis for the light receiving portion 22 of the first light projector/receiver 20A and the light receiving portion 22 of the second light projector/receiver 20B (S50). That is, the second evaluation unit 30B calculates and compares the two measured distances $R_A$ ($T_A$) and $R_B$ ($T_A$), and compares the measured distance $R_A$ ($\Delta T$) calculated using the light projecting after time $\Delta T$ with the distance difference $\Delta S$ if the $R_A$ ($T_A$) and the $R_A$ ($T_B$) do not match. Then, the second evaluation unit 30B determines from the comparison result whether an abnormality occurs in the light projecting portion 22 of the first light projector/receiver 20A and the light projecting portion 22 of the second light projector/receiver 20B. After that, the first evaluation unit 30A and the second evaluation unit 30B determine whether the result diagnosed by the first evaluation unit 30A according to the processing of S41-S49 matches with the result diagnosed by the second evaluation unit 30B in S50 (S51). If it is determined to be matched ("YES" in S51), the optical safety sensor 1 ends the light projecting portion diagnosis processing and transits to the caller of the light projecting portion diagnosis processing with the diagnosis results up to the moment. On the other hand, if it is determined to be unmatched ("NO" in S51), the optical sensor 1 sets an error indicating that the location where the abnormality occurs is unknown (S52) and transits to the caller of the light projecting portion diagnosis processing.

Furthermore, the projected and received light used by the first evaluation unit 30A for the diagnosis and the projected and received light used by the second evaluation unit 30B for the diagnosis are the same. In other words, the first evaluation unit 30A and the second evaluation unit 30B execute the processing of S41-S49 and a processing of S50 respectively with the same timing. Besides, diagnosis results in each evaluation unit are compared in S51. In this way, the optical safety sensor 1 can carries out the abnormality diagnosis on the light projecting portions with accuracy higher than the configuration in which there is one evaluation unit.

By the processing above, the optical safety sensor 1 can detect an occasion when the malfunction is generated in any one of the light projectors/receivers by comparing distance results obtained by each light projector/receiver. In addition, commercial modules operating in the TOF method can be used as the light projectors/receivers, so that compared with the configuration recited in patent literature 1 that uses standard light projectors and standard light receivers dedicated to self-test, the optical safety sensor can be inexpensively implemented.

Furthermore, because the projected light from one light projector/receiver can be received in another light projector/receiver, when the malfunction occurs, the light projecting portion and the light receiving portion of each light projector/receiver can be diagnosed to specify the abnormality location. Furthermore, the results of the abnormality diagnosis carried out by each evaluation unit can be compared to improve the accuracy of the diagnosis results.

Variation Example

In the aforementioned configuration example, the optical safety sensor 1 is a configuration including only one group consisting of the first light projector/receiver 20A and the second light projector/receiver 20B. However, the configuration may be a configuration which further includes, for example, more than one group that is different from the aforementioned group, consists of a plurality of light projectors/receivers and sets a region different from the monitoring area monitored by the aforementioned group as a monitoring target. That is, the first evaluation unit 30A and the second evaluation unit 30B may be connected to a plurality of light projectors/receivers to monitor a plurality of regions. However, it is necessary that each of the plurality of regions that the first evaluation unit 30A monitors can also be monitored by the second evaluation unit 30B. On this occasion, the first evaluation unit 30A and the second evaluation unit 30B switch the groups of the light projectors/receivers monitoring the same region in turn to carry out the distance measurement and the abnormality diagnosis. Particularly, the distance measurement portion 31 may switch each group in turn to measure the distance for each monitoring area, and the detection portion 32 may switch each group in turn to detect the abnormality in each group. Besides, the first evaluation unit 30A and the second evaluation unit 30B may use the first output portion 10A and the second output portion 10B to output the measured distance or the like.

SUMMARY

The optical safety sensor (1) according to aspect 1 of the disclosure is a configuration which includes: a plurality of light projectors/receivers (the first light projector/receiver 20A and the second light projector/receiver 20B), which includes the light projecting portions (21) projecting the light to the monitoring area and the light receiving portions (22) receiving reflected light from the monitoring area; a plurality of distance measurement portions (31), which measures the distance to the subject within the monitoring area using time required from the light projecting to the light receiving; and a plurality of detection portions (32), which detects, based on measurement results obtained by the distance measurement portions, the abnormality occurring in any one of the plurality of light projectors/receivers; wherein one light projector/receiver forms one set with one corresponding distance measurement portion and one corresponding detection portion, and each of the light receiving portions included in the plurality of light projectors/receivers receives the reflected light caused by the light projected from the light projecting portions of all the plurality of light projectors/receivers.

According to the configuration above, the distance to the subject within the monitoring area is measured by a plurality of light projectors/receivers, so that even if the malfunction is generated in any one of the light projectors/receivers, normal monitoring can also be continued. In addition, by comparing distance measurement results obtained by each light projector/receiver, an occasion when the malfunction is generated in any one of the light projectors/receivers can be detected. In addition, because commercial modules operating in the TOF method can be used as the light projectors/receivers, compared with the configuration recited in patent literature 1 that uses standard light projectors and standard light receivers dedicated to self-test, the optical safety sensor can be inexpensively implemented.

Furthermore, the projected light from one light projector/receiver can be received in another light projector/receiver, so that the light projecting portion and the light receiving portion of each light projector/receiver can be diagnosed to specify the abnormality location when the malfunction occurs.

The optical safety sensor (1) according to aspect 2 of the disclosure may be the configuration in the aforementioned aspect 1, wherein more than one group consisting of a plurality of light projectors/receivers, which is different from the group consisting of the plurality of light projectors/receivers (the first light projector/receiver 20A and the second light projector/receiver 20B), is further included, and the monitoring areas which are targets of each group are different; and the distance measurement portions (31) switch each group in turn to measure the distance, and the detection portions (32) switch each group in turn to detect the abnormality.

According to the configuration above, as for the abnormality diagnosis of the light projectors/receivers included in the plurality of groups with different monitoring areas, the distance measurement and the abnormality diagnosis can be carried out by one distance measurement portion and one detection portion. Therefore, by sharing the distance measurement portions and the detection portions, a wider area can be safely monitored while suppressing equipment cost at a low level.

The optical safety sensor (1) according to aspect 3 of the disclosure may be the configuration in the aforementioned aspect 1 or 2, wherein when a measured distance based on the time from the light projecting by the light projecting portion (21) of the first light projector/receiver (20A), which is one light projector/receiver of the plurality of light projectors/receivers (the first light projector/receiver 20A and the second light projector/receiver 20B), to the light receiving by the light receiving portion (22) of the first light projector/receiver, does not match with the measured distance based on the time from the light projecting by the light projecting portion (21) of the second light projector/receiver (20B), which is different from the first light projector/receiver, to the light receiving by the light receiving portion (22) of the second light projector/receiver, the detection portions determine that the abnormality occurs in any one of the first light projector/receiver and the second light projector/receiver.

According to the configuration above, by comparing the measured distance based on the time form the light projecting to the light receiving in the first light projector/receiver and the second light projector/receiver, whether the abnormality occurs in any one of the first light projector/receiver and the second light projector/receiver can be determined.

The optical safety sensor (1) according to aspect 4 of the disclosure may be the configuration in the aforementioned aspect 3, wherein when the measured distance based on the time from the light projecting by the light projecting portion (21) of the first light projector/receiver (20A) to the light receiving by the light receiving portion (22) of the first light projector/receiver does not match with the measured distance based on the time from the light projecting by the light projecting portion (21) of the second light projector/receiver (20B) to the light receiving by the light receiving portion of the first light projector/receiver, the detection portions (32) determine that the abnormality occurs in any one of the light receiving portion of the first light projector/receiver and the light receiving portion of the second light projector/receiver.

According to the configuration above, whether the abnormality occurs in at least any one of the light projecting portion of the first light projector/receiver and the light projecting portion of the second light projector/receiver can be determined by comparing the measured distance based on the time until specific light receiving portions receive light projected respectively by the plurality of mutually different light projecting portions.

The optical safety sensor (1) according to aspect 5 of the disclosure may be the configuration in aspect 4, wherein when it is determined that the abnormality occurs in any one of the light projecting portion (21) of the first light projector/receiver (20A) and the light projecting portion (21) of the second light projector/receiver (20B), if the difference between the measured distance, which is based on the time from the light projecting by the light projecting portion of the first light projector/receiver started at a first time T=0 to the light receiving by the light receiving portion (22) of the first light projector/receiver, and the measured distance, which is based on the time from the first time T=0 to the light receiving by the light receiving portion of the first light projector/receiver when the light projecting by the light projecting portion of the first light projector/receiver is started after time ΔT from the first time T=0, is different from the distance difference ΔS based on the time ΔT, the detection portions (32) determine that the abnormality occurs in the light projecting portion of the first light projector/receiver; and if the difference between the measured distance, which is based on the time from the light projecting by the light projecting portion of the second light projector/receiver started at the first time T=0 to the light receiving by the light receiving portion (22) of the first light projector/receiver, and the measured distance, which is based on the time from the first time T=0 to the light receiving by the light receiving portion of the first light projector/receiver when the light projecting by the light projecting portion of the second light projector/receiver is started after the time ΔT from the first time T=0, is different from the distance difference ΔS based on the time ΔT, the detection portions (32) determine that the abnormality occurs in the light projecting portion of the second light projector/receiver.

According to the configuration above, measured distance, the presence or absence of abnormality in the light projecting portion of the first light projector/receiver and the presence or absence of abnormality in the light projecting portion of the second light projector/receiver can be determined separately using the difference between the measured distances based on the time from each of the two times of light projecting with a time interval to the light receiving.

The optical safety sensor (1) according to aspect 6 of the disclosure may be the configuration in any one of aspects 3 to 5, wherein when the measured distance based on the time from the light projecting by the light projecting portion (21) of the first light projector/receiver (20A) to the light receiving by the light receiving portion (22) of the first light projector/receiver does not match with the measured distance based on the time from the light projecting by the light projecting portion of the first light projector/receiver to the light receiving by the light receiving portion (22) of the second light projector/receiver (20B), the detection portions (32) determine that the abnormality occurs in any one of the light receiving portion of the first light projector/receiver and the light receiving portion of the second light projector/receiver.

According to the configuration above, whether the abnormality occurs in at least any one of the light receiving portion of the first light projector/receiver and the light receiving portion of the second light projector/receiver can be determined by comparing the measured distance based on the time for the projected light of the specific light projecting portions being respectively received by the plurality of mutually different light receiving portions.

The optical safety sensor (1) according to aspect 7 of the disclosure may be the configuration in aspect 6, wherein when it is determined that the abnormality occurs in any one of the light receiving portion (22) of the first light projector/receiver (20A) and the light receiving portion (22) of the second light projector/receiver (20B), if the difference between the measured distance, which is based on the time from the light projecting by the light projecting portion (21) of the first light projector/receiver started at a first time T=0 to the light receiving by the light receiving portion of the first light projector/receiver, and the measured distance, which is based on the time from the first time T=0 to the light receiving by the light receiving portion of the first light projector/receiver when the light projecting by the light projecting portion of the first light projector/receiver is started after time ΔT from the first time T=0, is different from the distance difference ΔS based on the time ΔT, the detection portions (32) determine that the abnormality occurs in the light receiving portion of the first light projector/receiver; and if the difference between the measured distance, which is based on the time from the light projecting by the light projecting portion of the first light projector/receiver started at the first time T=0 to the light receiving by the light receiving portion of the second light projector/receiver, and the measured distance, which is based on the time from the first time T=0 to the light receiving by the light receiving portion of the second light projector/receiver when the light projecting by the light projecting portion of the first light projector/receiver is started after the time ΔT from the first time T=0, is different from the distance difference ΔS based on the time ΔT, the detection portions (32) determine that the abnormality occurs in the light receiving portion of the second light projector/receiver.

According to the configuration above, the presence or absence of abnormality in the light receiving portion of the first light projector/receiver and the presence or absence of abnormality in the light receiving portion of the second light projector/receiver can be determined separately using the difference between the measured distances based on the time from each of the two times of light projecting with a time interval to the light receiving.

The optical safety sensor (1) according to aspect 8 of the disclosure may be the configuration in any one of aspects 3 to 7, wherein when the detection result in the detection portion (32) which forms one set with the first light projector/receiver (20A) and the detection result in another detection portion (32) which forms one set with the second light projector/receiver (20B) are compared with one another, and the detection results are different from one another, an error is output.

According to the configuration above, the detection result of the first light projector/receiver and the detection result of the second light projector/receiver can be compared with one another. When the detection results are different from one another, it is considered that the abnormality occurs in at least any one of the detection results, so that the error is output on such an occasion, by which the presence and absence of abnormality can be determined with higher accuracy.

[Implementation Example Using Software]

A control block of the optical safety sensor 1 (especially the distance measurement portion 31 and the detection portion 32) may be implemented by a logic circuit (hardware) formed in an integrated circuit (IC chip) and the like, or may be implemented by software.

In the latter case, the optical safety sensor 1 includes a computer that executes commands of a program which is software for implementing each function. The computer includes, for example, more than one processors and a computer readable recording medium in which the above program is stored. Besides, the processor reads the program from the recording medium and executes the program in the computer, thereby achieving the purpose of the disclosure. A CPU (Central Processing Unit) for example can be used as the processor. In addition to a "non-transitory tangible media" such as a ROM (Read Only Storage) and the like, a tape, a disk, a card, a semiconductor memory, a programmable logic circuit or the like can be used as the above recording medium. Besides, a RAM (Random Access Storage) and the like for decompressing the program may be further included. In addition, the program may be supplied to the computer via an optional transmission medium (a communication network or a broadcast wave or the like) capable of transmitting the program. Furthermore, one aspect of the disclosure can also be implemented in a form of a data signal which is embedded in a carrier wave and in which the program is embodied by an electronic transmission.

The disclosure is not limited to the embodiments described above, and various changes can be made in the scope shown by the claims. Embodiments obtained by appropriately combining technical means respectively disclosed in different embodiments are also included in the technical scope of the disclosure.

What is claimed is:

1. An optical safety sensor, comprising:
   a plurality of light projectors/receivers, which is provided with light projecting portions projecting light to a monitoring area and light receiving portions receiving reflected light from the monitoring area;

a plurality of distance measurement portions, which measures distances to a subject within the monitoring area using time required from the light projecting to the light receiving; and a plurality of detection portions, which detects, based on distances obtained by the distance measurement portions, an abnormality occurring in the light projecting portion of any one of the plurality of light projectors/receivers, wherein one of the light projectors/receivers forms one set with a corresponding one of the distance measurement portions and a corresponding one of the detection portions; and each of the light receiving portions provided in the plurality of light projectors/receivers receives the reflected light caused by the light projected from the light projecting portions of all the plurality of light projectors/receivers.

2. The optical safety sensor according to claim 1, wherein more than one group consisting of a plurality of light projectors/receivers, which is different from the group consisting of the plurality of said light projectors/receivers, is further provided, and monitoring areas which are targets of each group are different;

the distance measurement portions switch each of the groups in turn to measure the distances, and the detection portions switch each of the groups in turn to detect the abnormality.

3. The optical safety sensor according to claim 2, wherein when a measured distance based on the time from the light projecting by the light projecting portion of a first light projector/receiver, which is one light projector/receiver of the plurality of light projectors/receivers, to the light receiving by the light receiving portion of the first light projector/receiver does not match with a measured distance based on the time from the light projecting by the light projecting portion of a second light projector/receiver, which is different from the first light projector/receiver, to the light receiving by the light receiving portion of the second light projector/receiver, the detection portions determine that the abnormality occurs in any one of the first light projector/receiver and the second light projector/receiver.

4. The optical safety sensor according to claim 3, wherein when the measured distance based on the time from the light projecting by the light projecting portion of the first light projector/receiver to the light receiving by the light receiving portion of the first light projector/receiver does not match with the measured distance based on the time from the light projecting by the light projecting portion of the second light projector/receiver to the light receiving by the light receiving portion of the first light projector/receiver, the detection portions determine that the abnormality occurs in any one of the light projecting portion of the first light projector/receiver and the light projecting portion of the second light projector/receiver.

5. The optical safety sensor according to claim 3, wherein when the measured distance based on the time from the light projecting by the light projecting portion of the first light projector/receiver to the light receiving by the light receiving portion of the first light projector/receiver does not match with the measured distance based on the time taken from the light projecting by the light projecting portion of the first light projector/receiver to the light receiving by the light receiving portion of the second light projector/receiver, the detection portions determine that the abnormality occurs in any one of the light receiving portion of the first light projector/receiver and the light receiving portion of the second light projector/receiver.

6. The optical safety sensor according to claim 3, wherein when a detection result in one of the detection portions which forms one set with the first light projector/receiver and a detection result in another one of the detection portions which forms one set with the second light projector/receiver are compared with one another, and the detection results are different with one another, an error is output.

7. The optical safety sensor according to claim 1, wherein when a measured distance based on the time from the light projecting by the light projecting portion of a first light projector/receiver, which is one light projector/receiver of the plurality of light projectors/receivers, to the light receiving by the light receiving portion of the first light projector/receiver does not match with a measured distance based on the time from the light projecting by the light projecting portion of a second light projector/receiver, which is different from the first light projector/receiver, to the light receiving by the light receiving portion of the second light projector/receiver, the detection portions determine that the abnormality occurs in any one of the first light projector/receiver and the second light projector/receiver.

8. The optical safety sensor according to claim 7, wherein when the measured distance based on the time from the light projecting by the light projecting portion of the first light projector/receiver to the light receiving by the light receiving portion of the first light projector/receiver does not match with the measured distance based on the time from the light projecting by the light projecting portion of the second light projector/receiver to the light receiving by the light receiving portion of the first light projector/receiver, the detection portions determine that the abnormality occurs in any one of the light projecting portion of the first light projector/receiver and the light projecting portion of the second light projector/receiver.

9. The optical safety sensor according to claim 8, wherein when it is determined that the abnormality occurs in any one of the light projecting portion of the first light projector/receiver and the light projecting portion of the second light projector/receiver, if the difference between the measured distance, which is based on the time from the light projecting by the light projecting portion of the first light projector/receiver started at a first time $T=0$ to the light receiving by the light receiving portion of the first light projector/receiver, and the measured distance, which is based on the time from the first time $T=0$ to the light receiving by the light receiving portion of the first light projector/receiver when the light projecting by the light projecting portion of the first light projector/receiver is started after time $\Delta T$ from the first time $T=0$, is different from a distance difference $\Delta S$ based on the time $\Delta T$, the detection portions determine that the abnormality occurs in the light projecting portion of the first light projector/receiver; and if the difference between the measured distance, which is based on the time from the light projecting by the light projecting portion of the second light projector/receiver started at the first time $T=0$ to the light receiving by the light receiving portion of the first light projector/receiver, and the measured distance, which is based on the time from the first time $T=0$ to the light receiving by the light receiving portion of the first light projector/receiver when the light projecting by the light projecting portion of the second light projector/receiver is started after the time $\Delta T$ from the first time $T=0$, is different from the distance difference ΔS based on the time ΔT, the detection portions determine that the abnormality occurs in the light projecting portion of the second light projector/receiver.

10. The optical safety sensor according to claim 9, wherein when the measured distance based on the time from the light projecting by the light projecting portion of the first light projector/receiver to the light receiving by the light receiving portion of the first light projector/receiver does not match with the measured distance based on the time taken from the light projecting by the light projecting portion of the first light projector/receiver to the light receiving by the light receiving portion of the second light projector/receiver, the detection portions determine that the abnormality occurs in any one of the light receiving portion of the first light projector/receiver and the light receiving portion of the second light projector/receiver.

11. The optical safety sensor according to claim 10, wherein when it is determined that the abnormality occurs in any one of the light receiving portion of the first light projector/receiver and the light receiving portion of the second light projector/receiver,
if the difference between the measured distance, which is based on the time from the light projecting by the light projecting portion of the first light projector/receiver started at the first time T=0 to the light receiving by the light receiving portion of the first light projector/receiver, and the measured distance, which is based on the time from the first time T=0 to the light receiving by the light receiving portion of the first light projector/receiver when the light projecting by the light projecting portion of the first light projector/receiver is started after the time ΔT from the first time T=0, is different from the distance difference ΔS based on the time ΔT, the detection portions determine that the abnormality occurs in the light receiving portion of the first light projector/receiver; and
if the difference between the measured distance, which is based on the time from the light projecting by the light projecting portion of the first light projector/receiver started at the first time T=0 to the light receiving by the light receiving portion of the second light projector/receiver, and the measured distance, which is based on the time from the first time T=0 to the light receiving by the light receiving portion of the second light projector/receiver when the light projecting by the light projecting portion of the first light projector/receiver is started after the time ΔT from the first time T=0, is different from the distance difference ΔS based on the time ΔT, the detection portions determine that the abnormality occurs in the light receiving portion of the second light projector/receiver.

12. The optical safety sensor according to claim 9, wherein when a detection result in one of the detection portions which forms one set with the first light projector/receiver and a detection result in another one of the detection portions which forms one set with the second light projector/receiver are compared with one another, and the detection results are different with one another, an error is output.

13. The optical safety sensor according to claim 8, wherein when the measured distance based on the time from the light projecting by the light projecting portion of the first light projector/receiver to the light receiving by the light receiving portion of the first light projector/receiver does not match with the measured distance based on the time taken from the light projecting by the light projecting portion of the first light projector/receiver to the light receiving by the light receiving portion of the second light projector/receiver, the detection portions determine that the abnormality occurs in any one of the light receiving portion of the first light projector/receiver and the light receiving portion of the second light projector/receiver.

14. The optical safety sensor according to claim 13, wherein when it is determined that the abnormality occurs in any one of the light receiving portion of the first light projector/receiver and the light receiving portion of the second light projector/receiver,
if the difference between the measured distance, which is based on the time from the light projecting by the light projecting portion of the first light projector/receiver started at the first time T=0 to the light receiving by the light receiving portion of the first light projector/receiver, and the measured distance, which is based on the time from the first time T=0 to the light receiving by the light receiving portion of the first light projector/receiver when the light projecting by the light projecting portion of the first light projector/receiver is started after the time ΔT from the first time T=0, is different from the distance difference ΔS based on the time ΔT, the detection portions determine that the abnormality occurs in the light receiving portion of the first light projector/receiver; and
if the difference between the measured distance, which is based on the time from the light projecting by the light projecting portion of the first light projector/receiver started at the first time T=0 to the light receiving by the light receiving portion of the second light projector/receiver, and the measured distance, which is based on the time from the first time T=0 to the light receiving by the light receiving portion of the second light projector/receiver when the light projecting by the light projecting portion of the first light projector/receiver is started after the time ΔT from the first time T=0, is different from the distance difference ΔS based on the time ΔT, the detection portions determine that the abnormality occurs in the light receiving portion of the second light projector/receiver.

15. The optical safety sensor according to claim 8, wherein when a detection result in one of the detection portions which forms one set with the first light projector/receiver and a detection result in another one of the detection portions which forms one set with the second light projector/receiver are compared with one another, and the detection results are different with one another, an error is output.

16. The optical safety sensor according to claim 7, wherein when the measured distance based on the time from the light projecting by the light projecting portion of the first light projector/receiver to the light receiving by the light receiving portion of the first light projector/receiver does not match with the measured distance based on the time taken from the light projecting by the light projecting portion of the first light projector/receiver to the light receiving by the light receiving portion of the second light projector/receiver, the detection portions determine that the abnormality occurs in any one of the light receiving portion of the first light projector/receiver and the light receiving portion of the second light projector/receiver.

17. The optical safety sensor according to claim 16, wherein when it is determined that the abnormality occurs in any one of the light receiving portion of the first light projector/receiver and the light receiving portion of the second light projector/receiver,
if the difference between the measured distance, which is based on the time from the light projecting by the light projecting portion of the first light projector/receiver started at the first time T=0 to the light receiving by the light receiving portion of the first light projector/receiver, and the measured distance, which is based on the time from the first time T=0 to the light receiving by the light receiving portion of the first light projector/receiver when the light projecting by the light projecting portion of the first light projector/receiver is started after the time ΔT from the first time T=0, is different from the distance difference ΔS based on the time ΔT, the detection portions determine that the abnormality occurs in the light receiving portion of the first light projector/receiver; and if the difference between the measured distance, which is based on the time from the light projecting by the light projecting portion of the first light projector/receiver started at the first time T=0 to the light receiving by the light receiving portion of the second light projector/receiver, and the measured distance, which is based on the time from the first time T=0 to the light receiving by the light receiving portion of the second light projector/receiver when the light projecting by the light projecting portion of the first light projector/receiver is started after the time ΔT from the first time T=0, is different from the distance difference ΔS based on the time ΔT, the detection portions determine that the abnormality occurs in the light receiving portion of the second light projector/receiver.

18. The optical safety sensor according to claim 17, wherein when a detection result in one of the detection portions which forms one set with the first light projector/receiver and a detection result in another one of the detection portions which forms one set with the second light projector/receiver are compared with one another, and the detection results are different with one another, an error is output.

19. The optical safety sensor according to claim 16, wherein when a detection result in one of the detection portions which forms one set with the first light projector/receiver and a detection result in another one of the detection portions which forms one set with the second light projector/receiver are compared with one another, and the detection results are different with one another, an error is output.

20. The optical safety sensor according to claim 7, wherein when a detection result in one of the detection portions which forms one set with the first light projector/receiver and a detection result in another one of the detection portions which forms one set with the second light projector/receiver are compared with one another, and the detection results are different with one another, an error is output.

* * * * *